(12) United States Patent
Handa

(10) Patent No.: US 8,581,935 B2
(45) Date of Patent: Nov. 12, 2013

(54) ORIENTATION-FOLLOWING DISPLAY APPARATUS, ORIENTATION-FOLLOWING DISPLAY METHOD, AND ORIENTATION-FOLLOWING DISPLAY PROGRAM

(75) Inventor: Ibuki Handa, Hamamatsu (JP)

(73) Assignee: Yamaha Corporation, Hamamatsu-Shi, Shizuoka-Ken (JP)

( * ) Notice: Subject to any disclaimer, the term of this patent is extended or adjusted under 35 U.S.C. 154(b) by 1168 days.

(21) Appl. No.: 12/496,026

(22) Filed: Jul. 1, 2009

(65) Prior Publication Data

US 2010/0002015 A1    Jan. 7, 2010

(30) Foreign Application Priority Data

Jul. 3, 2008  (JP) ................................ 2008-174638

(51) Int. Cl.
*G09G 5/00*    (2006.01)

(52) U.S. Cl.
USPC ........................................................ 345/659

(58) Field of Classification Search
USPC ........................................................ 345/659
See application file for complete search history.

(56) References Cited

U.S. PATENT DOCUMENTS

| | | | | |
|---|---|---|---|---|
| 6,115,025 A * | 9/2000 | Buxton et al. | ................ | 345/659 |
| 6,567,101 B1 * | 5/2003 | Thomas | ........................ | 345/649 |
| 7,352,361 B2 * | 4/2008 | Yi | .................. | 345/158 |
| 7,782,342 B2 * | 8/2010 | Koh | ............................ | 345/659 |
| 8,314,817 B2 * | 11/2012 | Williamson et al. | .......... | 345/659 |
| 2008/0195315 A1 * | 8/2008 | Hu et al. | ....................... | 701/212 |
| 2009/0040312 A1 * | 2/2009 | Hattori | ......................... | 348/187 |

FOREIGN PATENT DOCUMENTS

| | | |
|---|---|---|
| JP | 2001-289646 A | 10/2001 |
| JP | 2005-242283 A | 9/2005 |

\* cited by examiner

*Primary Examiner* — Jeffrey Chow
(74) *Attorney, Agent, or Firm* — Dickstein Shapiro LLP

(57) ABSTRACT

A display device has a screen that can be positioned in arbitrary postures including a reference posture relative to a space having a reference horizontal orientation. The screen has an xyz orthogonal coordinate system, and the posture of the screen in the space is defined by z-x-z Euler angles $\alpha$, $\beta$, and $\gamma$ of the xyz orthogonal coordinate system. The screen displays an image to enable recognition of the reference horizontal orientation of the space. A control device derives a specific parameter $\alpha+\gamma$ as an angle by which the image is rotated so that the reference horizontal orientation recognized from the image follows the reference horizontal orientation of the space when the image is displayed on the screen at arbitrary postures.

6 Claims, 6 Drawing Sheets

ORIENTATION-FOLLOWING DISPLAY APPARATUS, ORIENTATION-FOLLOWING DISPLAY METHOD, AND ORIENTATION-FOLLOWING DISPLAY PROGRAM

BACKGROUND OF THE INVENTION

1. Technical Field of the Invention

The present invention relates to an orientation-following display apparatus, an orientation-following display method, and an orientation-following display program, and more particularly to an orientation-following display technology that is used for an electronic compass, a Personal Navigation Device (PND), or the like.

2. Description of the Related Art

An orientation-following display technology has been proposed, in which an image such as a map is rotated according to the posture of a screen of an electronic compass, a PND, a mobile phone, or the like so that an orientation (or direction) represented by the image follows the orientation in the real-world space. If information such as a map is displayed so as to follow the orientation, it is easy to recognize information represented by the image in association with the real-world space. In orientation-following display which is also called "heading up display", for example, an image displayed on a screen is rotated according to the tendencies of human to recognize a front-to-rear orientation of the screen represented by the image in association with the front-to-rear orientation in the real-world space when the screen is in a horizontal state. Patent References 1 and 2 describe an orientation-following display method in which an orientation on a map corresponding to the travel direction of a human who is walking is allowed to coincide with an orientation from the bottom side to the top side or from the front side to the rear side of the screen. In the conventional orientation-following display method, an image displayed on the screen is rotated according to the magnitude of the angle between the north of the real-world space and the projection of a coordinate axis fixed with respect to the screen onto a horizontal plane of the real-world space.

[Patent Reference 1] Japanese Patent Application Publication No. 2001-289646

[Patent Reference 2] Japanese Patent Application Publication No. 2005-242283

However, in the conventional orientation-following display method, an orientation on the map corresponding to the travel direction does not follow the travel direction in the real world when the screen is at a specific posture since, in the method, one of the three orthogonal coordinate axes fixed to the screen is selected according to the posture of the screen and the image displayed on the screen is rotated according to the angle between the projection of the selected axis and the north of the real-world space. An example of switching from a state in which the image of a compass needle is rotated according to the angle between the north and the projection of a y axis, which extends in a direction parallel to a long side of the screen, onto the horizontal plane to a state in which the compass needle image is rotated according to the angle between the north and the projection of a z axis, which extends in a direction perpendicular to the screen, onto the horizontal plane is described in detail as follows with reference to FIG. 9. Here, it is assumed that the switching from the y axis to the z axis is performed at a position of $y_1$ at which the y axis is inclined by 45 degrees with respect to the horizontal plane when a screen F is rotated about the z axis while maintaining the z axis in a horizontal state. In an interval in which the y axis is rotated from $y_0$ to $y_1$, a compass needle D displayed on the screen F is not rotated since the angle between the north (N) direction and the projection of the y axis onto the horizontal plane is constant. Accordingly, the disagreement between a north direction indicated by the compass needle D and the north in the real-world space gradually increases from 0 to 45 degrees in the interval in which the y axis is rotated from $y_0$ to $y_1$. This disagreement is subjectively recognized by the user and corresponds to the disagreement between the north of the real-world space and a north direction indicated by the compass needle D as a display target when the screen F has been rotated about an axis parallel to the lateral direction of the screen F until the screen F is parallel to the front-to-rear direction. In an interval in which the y axis is rotated from $y_1$ to $y_2$, the disagreement between the north direction indicated by the compass needle D and the north direction in the real-world space gradually decreases from 45 to 0 degrees. Although the image of the compass needle D has been described as a display target, such disagreements also occur when the display target is a map. In the case where an orientation represented by an image displayed on the screen does not follow the orientation in the real-world space, the user feels uncomfortable so that the confidence of the user in the displayed information is reduced or the user is confused.

SUMMARY OF THE INVENTION

The invention has been made to overcome the above problems, and it is an object of the invention to reduce the disagreement between an orientation recognized in a screen through an image displayed on the screen and the orientation in the real-world space.

(1) An orientation-following display apparatus for achieving the above object comprises: a display device having a screen that can be positioned in arbitrary postures including a reference posture relative to a space having a reference horizontal orientation, the screen having an xyz orthogonal coordinate system fixed to the screen, an x axis of the xyz orthogonal coordinate system being set parallel to a lateral direction in the space when the screen is positioned at the reference posture and a z axis of the xyz orthogonal coordinate system being perpendicular to the screen, the posture of the screen in the space being defined by z-x-z Euler angles $\alpha$, $\beta$, and $\gamma$ of the xyz orthogonal coordinate system, wherein the screen displays an image to enable recognition of the reference horizontal orientation of the space such that the reference horizontal orientation recognized in the screen coincides with the reference horizontal orientation of the space when the image is displayed on the screen at the reference posture; and a control device that derives $\alpha+\gamma$ as an angle by which the image is rotated so that the reference horizontal orientation recognized from the image follows the reference horizontal orientation of the space when the image is displayed on the screen at arbitrary postures.

The reference horizontal orientation is an orientation that is artificially defined with respect to a specific direction parallel to a horizontal plane in the real-world space. According to the invention, the specific parameter $\alpha+\gamma$ is derived as an angle by which the image is rotated and therefore the reference horizontal orientation in the screen recognized from the image follows the reference horizontal orientation in the real-world space. That is, since the sum of z-x-z Euler angles $\alpha$ and $\gamma$ other than the angle $\beta$ which corresponds to the component of rotation about the axis of the lateral direction of the user, is derived as an angle indicating the extent by which the image displayed on the screen of the reference posture should be rotated to become an image that is to be displayed on the screen when the posture of the screen has been changed, it is possible to reduce the disagreement between an orientation recognized in the screen through the image displayed on the screen and the orientation in the real-world space.

(2) In the orientation-following display apparatus for achieving the above object, preferably, when a posture matrix A, which is an orthonormal matrix representing a posture of the xyz orthogonal coordinate space in the real-world space, is represented as follows:

$$A = [x \quad y \quad z],$$

where $$x = \begin{bmatrix} a_{11} \\ a_{21} \\ a_{31} \end{bmatrix}, y = \begin{bmatrix} a_{12} \\ a_{22} \\ a_{32} \end{bmatrix}, z = \begin{bmatrix} a_{13} \\ a_{23} \\ a_{33} \end{bmatrix},$$

the control device derives α+γ as a value that satisfies the following equations:

$$\cos(\alpha + \gamma) = \frac{a_{11} + a_{22}}{\sqrt{(a_{11} + a_{22})^2 + (a_{12} - a_{21})^2}}$$

$$\sin(\alpha + \gamma) = \frac{a_{12} - a_{21}}{\sqrt{(a_{11} + a_{22})^2 + (a_{12} - a_{21})^2}}.$$

According to the invention, it is possible to derive α+γ through simple calculation without individually deriving α, β, and γ. Accordingly, it is possible to reduce delay due to calculation and therefore it is possible to reduce the disagreement between an orientation recognized in the screen through the image displayed on the screen and the orientation in the real-world space.

(3) In the orientation-following display apparatus for achieving the above object, the control device may determine reliability of the parameter α+γ derived as the angle by which the image is rotated, using $a_{33}$ as an indicator of the reliability.

When the value β of the z-x-z Euler angle is π, the screen is at the reverse of the reference posture. Here, the value of α+γ is indefinite. Since the $a_{33}$ element of the posture matrix A is equal to cos β, the value of α+γ is indefinite when $a_{33}$ is −1. When the screen is at the posture in a range of π/2<β≤π, the line of sight of the user to the screen is present above the horizontal. However, when β is in the range of π/2<β≤π, the user may feel uncomfortable since the image is not rotated in the range even when the screen is rotated about the axis of the lateral direction. In consideration of a posture detection error, when the value of β is near π, it is likely that the screen is at the reverse of the reference posture even though β is not equal to π. Accordingly, the reliability of the parameter α+γ as an angle by which the image is rotated may be determined according to the $a_{33}$ element of the posture matrix A.

(4) The orientation-following display apparatus for achieving the above object may further include an acceleration sensor that outputs acceleration data representing acceleration components of 3 axes, and a geomagnetic sensor that outputs geomagnetic data representing geomagnetic components of 3 axes, and the control device may derive a posture of the screen in the real-world space based on the acceleration data and the geomagnetic data and may rotate the image by an angle of α+γ according to the posture of the screen.

(5) An orientation-following display method for achieving the above object is performed in a display device having a screen that is positioned in arbitrary postures including a reference posture relative to a space having a reference horizontal orientation, the method comprising: setting an xyz orthogonal coordinate system to the screen such that an x axis of the xyz orthogonal coordinate system is set parallel to a lateral direction in the space when the screen is positioned at the reference posture and a z axis of the xyz orthogonal coordinate system is perpendicular to the screen; defining the posture of the screen in the space by z-x-z Euler angles α, β, and γ of the xyz orthogonal coordinate system; displaying an image in the screen to enable recognition of the reference horizontal orientation of the space such that the reference horizontal orientation recognized in the screen coincides with the reference horizontal orientation of the space when the image is displayed on the screen at the reference posture; and deriving α+γ as an angle by which the image is rotated so that the reference horizontal orientation recognized from the image follows the reference horizontal orientation of the space when the image is displayed on the screen at arbitrary postures.

According to the invention, it is possible to reduce the disagreement between an orientation recognized in the screen through the image displayed on the screen and the orientation in the real-world space.

(6) An orientation-following display program for achieving the above object is executable by the computer to perform a process of orientation-following display with a display device having a screen that is positioned in arbitrary postures including a reference posture relative to a space having a reference horizontal orientation, the process comprising: setting an xyz orthogonal coordinate system to the screen such that an x axis of the xyz orthogonal coordinate system is set parallel to a lateral direction in the space when the screen is positioned at the reference posture and a z axis of the xyz orthogonal coordinate system is perpendicular to the screen; defining the posture of the screen in the space by z-x-z Euler angles α, β, and γ of the xyz orthogonal coordinate system; displaying an image in the screen to enable recognition of the reference horizontal orientation of the space such that the reference horizontal orientation recognized in the screen coincides with the reference horizontal orientation of the space when the image is displayed on the screen at the reference posture; and deriving α+γ as an angle by which the image is rotated so that the reference horizontal orientation recognized from the image follows the reference horizontal orientation of the space when the image is displayed on the screen at arbitrary postures.

According to the invention, it is possible to reduce the disagreement between an orientation recognized in the screen through the image displayed on the screen and the orientation in the real-world space.

The functions of each element described in the claims are implemented by hardware resources whose functions are specified by the configuration itself, hardware resources whose functions are specified by a program, or a combination thereof. The functions of each element are not limited to those implemented by physically independent hardware resources. The invention also provides a machine-readable recording medium containing the orientation-following display program. Of course, the recording medium containing the orientation-following display program may be a magnetic recording medium or a magneto-optical recording medium and may be any other recording medium developed in the future.

DETAILED DESCRIPTION OF THE INVENTION

1. Principle

1.1. Recognition of Orientation

Figure 3A:
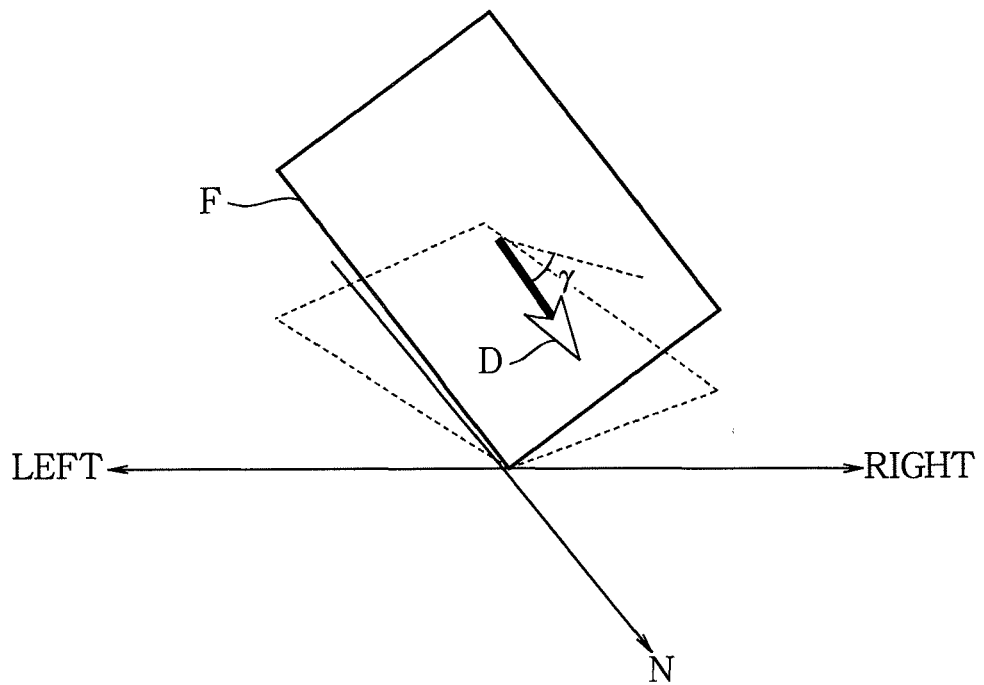
FIGS. 3A and 3B are perspective diagrams associated with the embodiment of the invention.
Figure 3B:
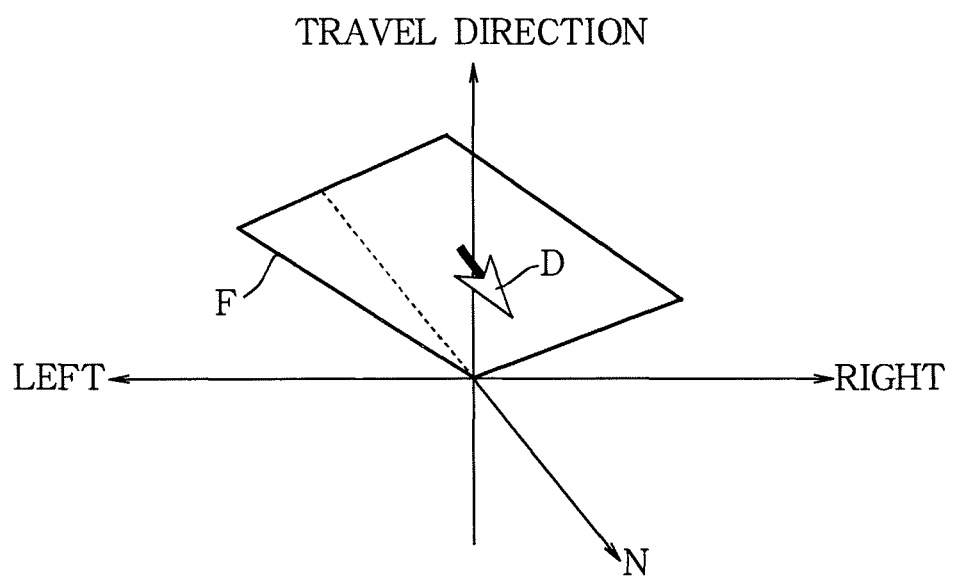
Figure 4:
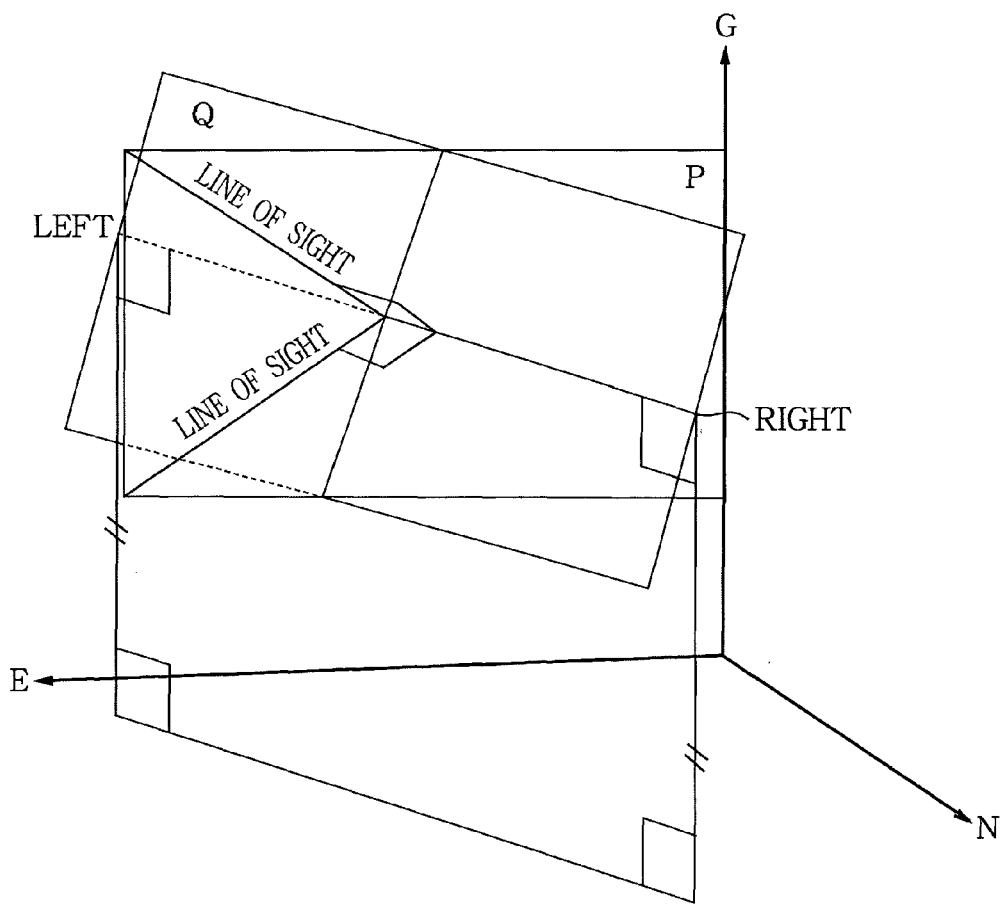
FIG. 4 is a perspective diagram associated with the embodiment of the invention.

The invention will focus on an image such as a compass needle which itself indicates orientation or on an image, recognition of the information of which is accompanied by a recognition of an orientation, such as a map, a chart, an architectural plan, an astronomical chart, or a photograph (for example, an aerial photograph or a satellite photograph) acquired by capturing an image of the earth's surface from above. In order to allow the user to recognize that an orientation that the user recognizes in the screen by viewing such an image coincides with the orientation in the real-world space and also to allow an orientation, which will be recognized in the screen through such an image displayed on the screen, to coincide with the orientation in the real-world space, it is necessary that, as shown in FIG. 3B, the north of the real-world space (i.e., the forward direction of the N axis) be parallel to a north direction (a direction indicated by an arrow D) that the user will recognize in a screen F from the image when the screen F has been rotated about an axis parallel to a lateral direction recognized by the user until the screen F is parallel to the front-to-rear direction as shown by a dashed line in FIG. 3A. The user recognizes that a direction in which a horizontal line included in a plane perpendicular to a line-of-sight direction extends is a lateral direction. Here, it is also assumed that a plane P including both the line of sight of the user toward the screen F and the vertical axis (i.e., the G axis) always intersects with a plane Q including the screen F at right angles as shown in FIG. 4.

The movement of the screen F that rotates from a reference posture to an arbitrary posture can be represented by a combination of respective rotation movements about 3 orthogonal axes fixed to the screen F. Orthogonal coordinate axes that are fixed to the screen F so that movements of rotation from the reference posture to an arbitrary posture can be represented by a combination of one rotation movement about an axis parallel to the lateral direction recognized by the user and two rotation movements about an axis perpendicular to the screen F are defined as in the following section 1.2. This enables derivation of an angle by which the image is to be rotated from the sum of rotation angles of the two rotation movements about the axis perpendicular to the screen F.

1.2. Definition of Coordinate System

Figure 1:
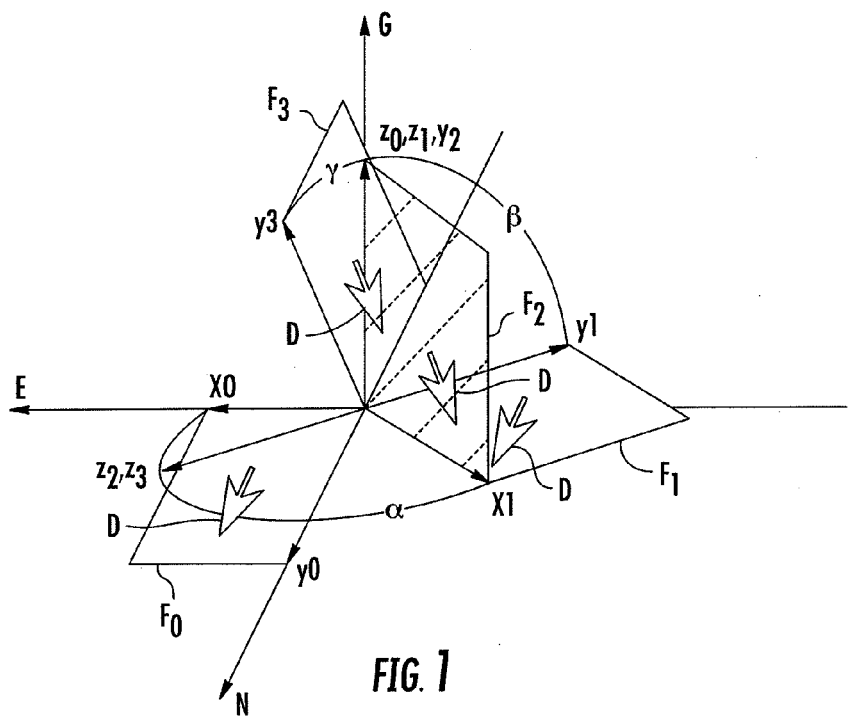
FIG. 1 is a perspective diagram associated with an embodiment of the invention.

FIG. 1 represents relations between orthogonal coordinate axes N, E, and G of the real-world space, orthogonal coordinate axes x, y, and z fixed to the screen F that moves in the real-world space, and z-x-z Euler angles ($\alpha$, $\beta$, $\gamma$). An orientation in the real-world space is determined by defining one reference orientation. Thus, an N axis, the forward direction of which coincides with the horizontal component of a vector which starts at one point on the earth's surface and which is directed to polar north, a G axis, the forward direction of which coincides with an upward vertical direction at the point, and an E axis which is obtained by rotating the N axis by 90 degrees about the G axis are defined, and the forward direction of the N axis (hereinafter referred to as "north") is defined as the reference horizontal orientation.

An xyz orthogonal coordinate space fixed with respect to the screen F is defined as follows. First, an axis, which is parallel to a long side of the screen F and has a forward direction directed from a bottom side to a top side of the screen F, is defined as the y axis. The bottom and top sides of the screen F are defined so as to be fixed with respect to the screen F according to the relation with a switch or the like that is generally disposed at an edge position of the screen F regardless of the direction of gravity. Here, it is assumed that a side of the screen F which is located at the upper side when the screen F is in an upright position such that text information is recognized as being erected in the case where the text information is displayed without rotation is the top side and a side facing the top side is the bottom side. Then, an axis, which is parallel to a short side of the screen F and has a forward direction directed from a left side to a right side of the screen F, is defined as the x axis. Here, it is assumed that two sides of the screen F which are located left and right, when the user views the screen F from the front side of the screen F which is at an upright position such that the top side of the screen F is located at the upper side when the user views the screen F and the bottom side of the screen F is located at the lower side when the user views the screen F, are the left and right sides of the screen F, respectively. Then, an axis, the forward direction of which is perpendicular to each of the x and y axes and is directed from the rear side to the front side of the screen F, is defined as the z axis. In FIGS. 1 and 2, the x, y, and z axes are illustrated for each posture of the screen F and an axis and a screen F corresponding to the same posture are denoted by the same subscript.

1.3. Reference Posture

An arbitrary posture of the screen F can be uniquely represented mathematically by defining a reference posture of the screen F in the real-world space. In the case where the xyz orthogonal coordinate space is defined with respect to the screen F as in section 1.2, an angle by which the image is rotated so as to follow the reference horizontal orientation can be derived through simple calculation by defining the reference posture as follows. That is, a posture of the screen F, at which the forward direction of the x axis coincides with the forward direction of the E axis, the forward direction of the y axis coincides with the north which is the reference horizontal orientation, and the forward direction of the z axis coincides with the forward direction of the G axis, is defined as the reference posture. The relation between the real-world space, the reference posture of the screen F, and the xyz orthogonal coordinate space fixed to the screen F may be defined arbitrarily, provided that the x axis used to define z-x-z Euler angles is parallel to the lateral direction recognized by the user and the z axis used to define z-x-z Euler angles is perpendicular to the screen F.

1.4. Orientation-Following Display

When the coordinate is defined as in section 1.2 and the reference posture is defined as in section 1.3, the z-x-z Euler angles ($\alpha$, $\beta$, $\gamma$) correspond to the following rotation angles of the screen F, respectively. $\alpha$ is an angle by which a screen $F_0$ which is at the reference posture is rotated about a $z_0$ axis.

That is, α is an angle by which the screen $F_0$ is inclined in the lateral direction of the user. Since the z axis and the G axis are parallel at the reference posture, α is also an angle by which the screen $F_0$ is rotated about the G axis which is the vertical axis. β is an angle by which a screen $F_1$ is rotated about an $x_1$ axis which is obtained by rotating the $x_0$ axis about the $z_0$ axis (i.e., the G axis) by the angle α. Since the $x_1$ axis is parallel to the lateral direction recognized by the user, β is also an angle by which the screen $F_1$ is rotated about an axis parallel to the lateral direction. γ is an angle by which a screen $F_2$ is rotated about a $z_2$ axis which is obtained by rotating the $z_1$ axis about the $x_1$ axis (or about an axis parallel to the lateral direction) by the angle β. γ is also an angle by which the screen $F_2$ is inclined in the lateral direction of the user.

Figure 2A:
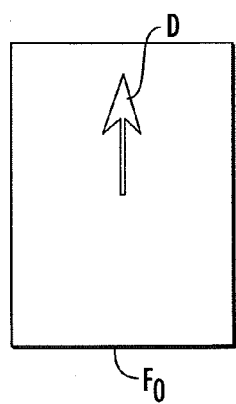
FIGS. 2A to 2D are perspective diagrams illustrating change of screens associated with the embodiment of the invention.
Figure 2B:
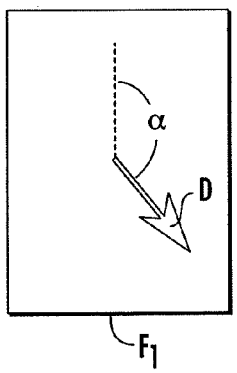
Figure 2C:
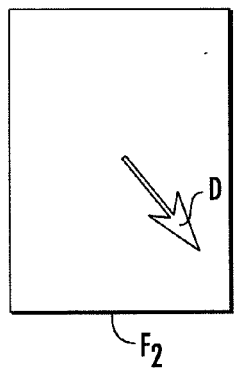
Figure 2D:
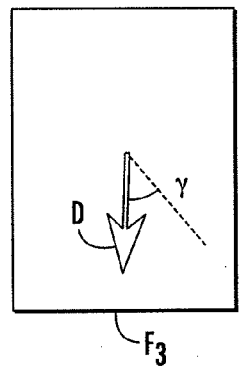

Although the course of transitioning the posture of the screen F from the screen $F_0$ to the screen $F_3$ shown in FIG. 1 may be taken arbitrarily, an orientation that is to be represented by the image displayed on the screen $F_3$ is the same, regardless of the transition course. Thus, it is assumed that the posture of the screen F is transitioned from the screen $F_0$ to the screen $F_3$ through 3 rotation movements that are defined by the z-x-z Euler angles. An image of the compass needle D that is displayed on the screen $F_0$ of the reference posture as shown in FIGS. 1 and 2A is rotated by the angle α as shown in FIGS. 1 and 2B through the rotation about the $z_0$ axis, the image of the compass needle D is not rotated as shown in FIGS. 1 and 2C through the rotation about the $x_1$ axis, and an image of the compass needle D that is displayed on the screen $F_2$ is rotated by the angle γ as shown in FIGS. 1 and 2D through the rotation about the $z_2$ axis. This allows the compass needle D to always indicate the north of the real-world space. Specifically, if the compass needle D, which is displayed on the screen F to indicate a north such that the north recognized in the screen F coincides with the north of the real-world space when the compass needle D is displayed on the screen F at the reference posture, is rotated by the angle of α+γ in the case where the coordinate space is defined as in section 1.2 and the reference posture is defined as in section 1.3, it is possible to display the compass needle D such that a north indicated by the compass needle D displayed on the screen F which is at an arbitrary posture is recognized as coincident with the north of the real-world space, no matter the course through which the posture of the screen F is changed from the reference posture to the arbitrary posture and no matter the posture to which the posture of the screen F is changed.

Thus, the sum of two angles α and γ of rotation of the screen F about the z axis perpendicular to the screen F may be used as an angle by which an image, which is displayed on the screen to indicate a reference horizontal orientation in the screen such that the reference horizontal orientation recognized in the screen coincides with the reference horizontal orientation in the real-world space when the image is displayed on the screen at the reference posture, is rotated. By deriving the rotation angle of the image in this manner, it is possible to allow an orientation that the user recognizes in the screen through the image displayed on the screen to always coincide with the orientation in the real-world space. That is, it is possible to allow the user to recognize that there is no disagreement between an orientation recognized in the screen through the image displayed on the screen and the orientation in the real-world space.

2. Embodiments 2.1. Configuration of Orientation-Following Display Apparatus

Figure 5:
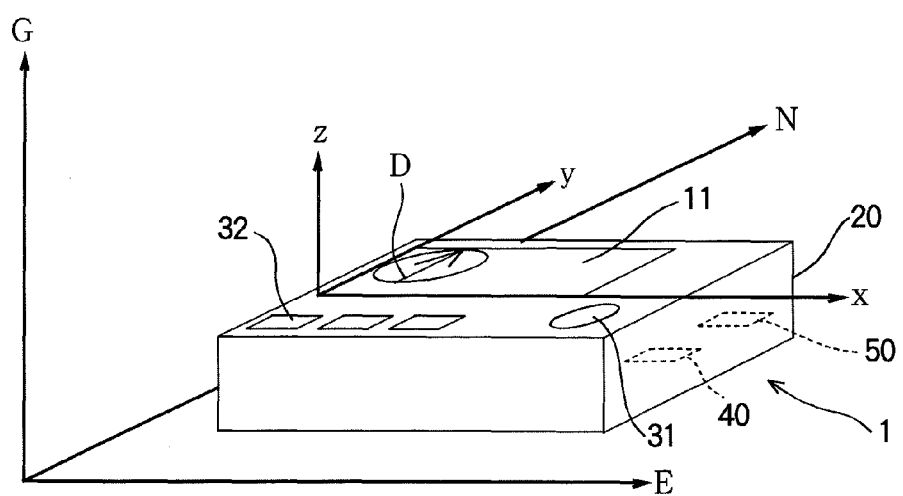
FIG. 5 is a perspective diagram associated with the embodiment of the invention.
Figure 6:
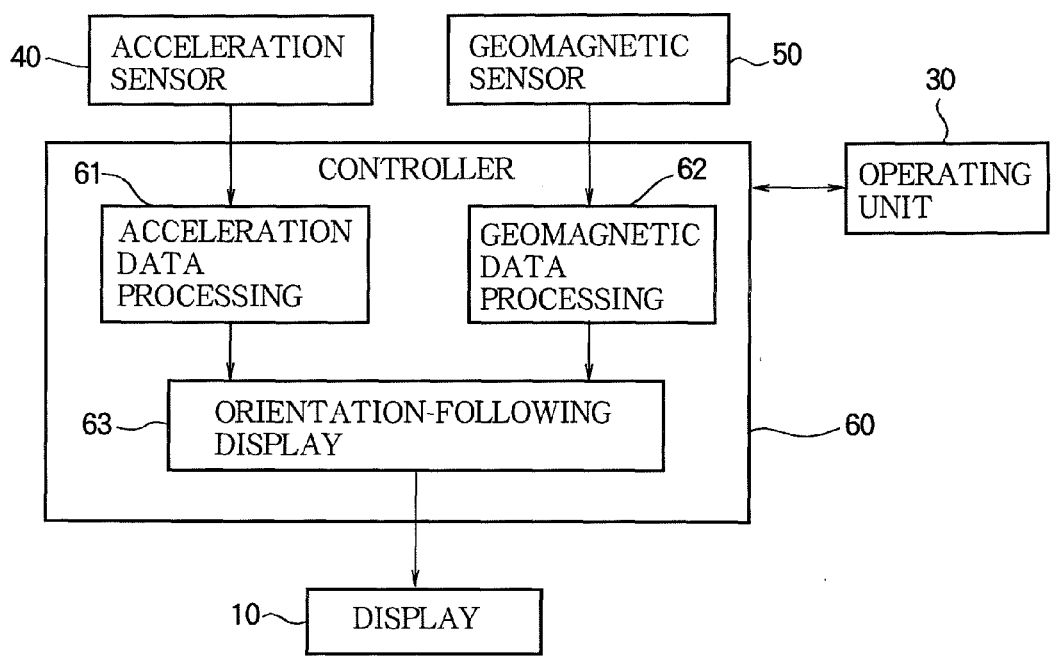
FIG. 6 is a block diagram associated with the embodiment of the invention.
Figure 7:
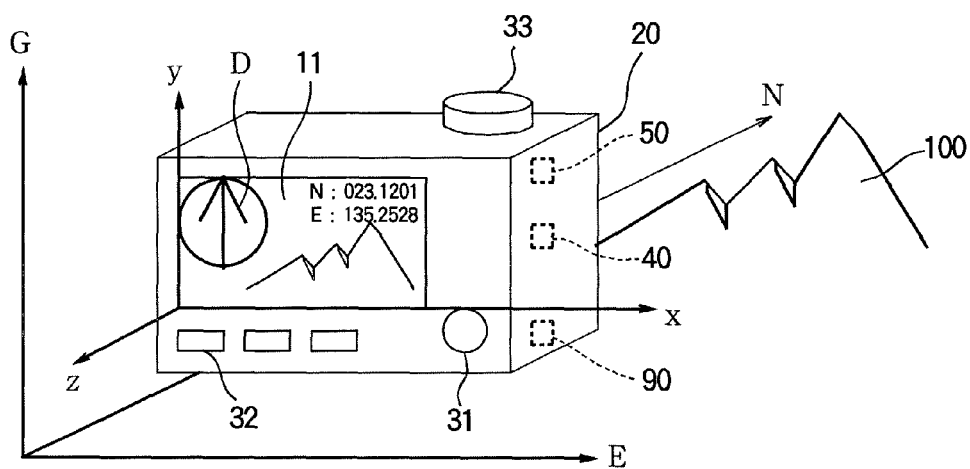
FIG. 7 is a perspective diagram associated with the embodiment of the invention.

FIGS. 5, 6, and 7 illustrate the configuration of a digital camera 1 as an embodiment of the orientation-following display apparatus according to the invention.

The digital camera 1 includes a display 10 is a device used to reproduce viewfinder and photograph image data, and an acceleration sensor 40 and a geomagnetic sensor 50 used to display a compass needle D on a screen 11 of the display 10. The display 10, the acceleration sensor 40, the geomagnetic sensor 50, an operating unit 30, and a lens or the like that are not shown are fixed to a casing 20.

The acceleration sensor 40 may be of any detection type such as a piezoresistive type, a capacitance type, or a thermal detection type. A force which is the sum of gravity and the inertial force of a system fixed to an object that moves integrally with the acceleration sensor 40 is detected as acceleration data which is vector data having 3 components of the x, y, and z axes described later. Accordingly, acceleration data output from the acceleration sensor 40 which is in a state of rest or uniform linear motion is vector data representing the magnitude and direction of gravitational acceleration in the xyz coordinate space fixed with respect to the screen F.

The geomagnetic sensor 50 includes 3-axis magnetic sensor units, each including a magnetoimpedance (MI) element or a magnetoresistance (MR) element. The geomagnetic sensor 50 outputs geomagnetic data that is data indicating a vector having a direction toward polar north using the 3 components of the x, y, and z axes described later. That is, the geomagnetic data is vector data representing the north of the real-world space in the xyz coordinate space fixed with respect to the screen F.

A controller 60 of the digital camera 1 is a microcomputer that performs data processing for orientation-following display and includes a processor, a memory, a bus, an input/output (I/O) interface, and the like that are not shown. The acceleration sensor 40, the geomagnetic sensor 50, the operating unit 30, the display 10, and the like are connected to the I/O interface of the controller 60. The operating unit 30 includes menu operating keys 31 and 32, a release button 33, and the like. According to operations performed on these switches, the controller 60 performs a variety of processes, displays a compass needle D, a photograph image, or the latitude and longitude of the current location on a screen 11, or records photograph image data in a machine readable and nonvolatile recording medium 90. When the original image of the compass needle D is displayed on the screen 11 without rotation, the original image represents a needle indicating a direction from the bottom side to the top side of the screen 11.

The controller 60 is a control device that performs an orientation-following display process for displaying a compass needle D, which follows the orientation in the real-world space, on the screen 11 by executing an orientation-following display program including an acceleration data processing module 61, a geomagnetic data processing module 62, and an orientation-following display module 63. That is, when the controller 60 executes the orientation-following display program, the controller 60 functions as a control device. The orientation-following display program may be stored in the recording medium 90.

The acceleration data processing module 61 is a program module that receives acceleration data output from the acceleration sensor 40 at intervals of a predetermined time (for example, at intervals of 0.2 seconds) and that performs a predetermined correction process such as offset correction on the acceleration data.

The geomagnetic data processing module 62 is a program module that receives geomagnetic data output from the geomagnetic sensor 50 at intervals of a predetermined time (for example, at intervals of 0.2 seconds) and that performs a predetermined correction process such as offset correction on the geomagnetic data.

The orientation-following display module 63 is a program module that generates a posture matrix A based on the acceleration data and the geomagnetic data, derives an angle by which the compass needle D is rotated based on the posture matrix A, rotates the image of the compass needle D by the derived angle, and stores the rotated image of the compass needle D in a frame memory region of the display 10.

FIG. 5 illustrates a relation between the reference posture and the real-world space. In this embodiment, it is assumed that the reference posture of the screen 11 is a posture at which the screen 11 is horizontal, facing up (i.e., a line of sight perpendicular to the screen 11 has a downward vertical direction), a short side of the rectangular screen 11 is parallel to the N axis of the real-world space, and a direction from the bottom-side to the top side of the screen 11 coincides with the forward direction of the N axis. In this embodiment, the top side of the screen 11 is one of the two long sides of the screen 11 which is closer to the release button 33 and the upper, lower, left, and right sides of the screen F are represented with reference to the top side.

In this embodiment, the x, y, and z orthogonal coordinate axes used to define the z-x-z Euler angles and the posture matrix A are defined such that the forward direction of the x axis coincides with a direction from the left side to the right side of the screen, the forward direction of the y axis coincides with a direction from the bottom side to the top side of the screen, the forward direction of the z axis coincides with a direction from the rear side to the front side of the screen 11, which is perpendicular to the screen 11. When the reference posture of the screen 11 is defined as described above, the forward direction of the x axis coincides with the forward direction of the E axis (i.e., the east direction), the forward direction of the y axis coincides with the forward direction of the N axis, and the forward direction of the z axis coincides with the forward direction of the G axis. Then, the x axis is parallel to a lateral direction recognized by the user viewing the screen 11.

The posture matrix A expressed by the following Equations (1) and (3) is data that uniquely represents the posture of an object and is defined as follows.

$$A = [x \ y \ z], \quad (1)$$

where $$x = \begin{bmatrix} a_{11} \\ a_{21} \\ a_{31} \end{bmatrix}, y = \begin{bmatrix} a_{12} \\ a_{22} \\ a_{32} \end{bmatrix}, z = \begin{bmatrix} a_{13} \\ a_{23} \\ a_{33} \end{bmatrix} \quad (3)$$

The posture matrix A is an orthonormal matrix that uniquely represents an arbitrary posture of the screen 11. When the screen 11 is rotated from the reference posture to an arbitrary posture, the posture matrix A is used to rotate the coordinate axes in order to represent a point defined in the NEG orthogonal coordinate space fixed in the real-world space in the xyz coordinate space fixed to the screen 11. A posture matrix A representing the reference posture of the screen 11 shown in FIG. 5 is expressed by the following Equation (4).

$$A = \begin{bmatrix} 1 & 0 & 0 \\ 0 & 1 & 0 \\ 0 & 0 & 1 \end{bmatrix} \quad (4)$$

A posture matrix A representing the posture of the screen 11 shown in FIG. 7 is expressed by the following Equation (5).

$$A = \begin{bmatrix} 1 & 0 & 0 \\ 0 & 0 & -1 \\ 0 & 1 & 0 \end{bmatrix} \quad (5)$$

The posture matrix A defined in this manner is derived from both offset-corrected acceleration data g and geomagnetic data h, each being a 3-dimensional vector, in the following manner.

First, a vector f is defined as follows.

$$f = g \times h,$$

where "×" represents cross product and "f" is a vector that represents the forward direction of the E axis in the xyz coordinate space.

In addition, a vector h' is defined as follows.

$$h' = f \times g,$$

where h' is a vector that represents the forward direction of the N axis in the xyz coordinate space.

The vectors f, h', and −g defined in this manner are each normalized to size 1 and are then arranged in rows, sequentially from the top, to produce the posture matrix A.

The relation between the posture matrix A and the z-x-z Euler angles (α, β, γ) is as follows.

Matrix representations of the first rotation by the angle α (i.e., the rotation about the $z_0$ axis shown in FIG. 1), the second rotation by the angle β (i.e., the rotation about the $x_1$ axis shown in FIG. 1), and the third rotation by the angle γ (i.e., the rotation about the $z_2$ axis shown in FIG. 1) are expressed by the following Equations (6), (7), and (8).

$$R_z(\alpha) = \begin{bmatrix} \cos\alpha & \sin\alpha & 0 \\ -\sin\alpha & \cos\alpha & 0 \\ 0 & 0 & 1 \end{bmatrix} \quad (6)$$

$$R_x(\beta) = \begin{bmatrix} 1 & 0 & 0 \\ 0 & \cos\beta & \sin\beta \\ 0 & -\sin\beta & \cos\beta \end{bmatrix} \quad (7)$$

$$R_z(\gamma) = \begin{bmatrix} \cos\gamma & \sin\gamma & 0 \\ -\sin\gamma & \cos\gamma & 0 \\ 0 & 0 & 1 \end{bmatrix} \quad (8)$$

Here, $0 \leq \alpha < 2\pi$, $0 \leq \beta \leq \pi$, and $0 \leq \gamma < 2\pi$. The relation between the rotation matrices Rz(α), Rx(β), and Rz(γ) and the posture matrix A is represented by the following Equation (9).

$$A = Rz(\alpha)Rx(\beta)Rz(\gamma) \quad (9)$$

Accordingly, the following simultaneous equations are satisfied.

$$a_{11} = \cos\alpha \cos\gamma - \cos\beta \sin\alpha \sin\gamma \quad (10)$$

$$a_{12} = \cos\alpha \sin\gamma + \cos\beta \sin\alpha \cos\gamma \quad (11)$$

$$a_{13} = \sin\beta \sin\alpha \quad (12)$$

$$a_{21} = -\sin\alpha \cos\gamma - \cos\beta \cos\alpha \sin\gamma \quad (13)$$

$$a_{22} = -\sin\alpha \sin\gamma + \cos\beta \cos\alpha \cos\gamma \quad (14)$$

$$a_{23} = \sin\beta \cos\alpha \quad (15)$$

$$a_{31} = \sin\beta \sin\gamma \quad (16)$$

$$a_{32} = -\sin\beta \cos\gamma \quad (17)$$

$$a_{33} = \cos\beta \quad (18)$$

Here, if X and Y are defined as follows:

$$X = a_{11} + a_{22}$$

$$Y = a_{12} - a_{21},$$

the following equations are obtained from the addition theorem.

$$X = (1 + \cos \beta) \cos(\alpha + \gamma)$$

$$Y = (1 + \cos \beta) \sin(\alpha + \gamma)$$

$$\cos(\alpha + \gamma) = \frac{a_{11} + a_{22}}{\sqrt{(a_{11} + a_{22})^2 + (a_{12} - a_{21})^2}} \quad (19)$$

$$\sin(\alpha + \gamma) = \frac{a_{12} - a_{21}}{\sqrt{(a_{11} + a_{22})^2 + (a_{12} - a_{21})^2}} \quad (20)$$

By deriving a value of α+γ which satisfies Equations (19) and (20), the sum of α and γ can be derived without individually deriving α, γ, and β. Deriving α+γ which satisfies Equations (19) and (20) is also advantageous in that there is no need to switch calculation procedures when β=0.

When α+γ which satisfies Equations (19) and (20) is derived, α+γ is derived for each of a half-open interval [0, 2π) and a half-open interval [2π, 4π). However, α+γ which satisfies Equations (19) and (20) may be assumed to be only in the half-open interval [0, 2π) since the rotation angle "α+γ" is equivalent to "α+γ+2π".

α+γ is indefinite when β=π. The $a_{33}$ element of the posture matrix A is −1 when the value of α+γ is indefinite since the $a_{33}$ element is equal to cos β. When the screen is at the posture in a range of π/2<β≤π, the line of sight of the user to the screen is present above the horizontal. However, when β is in the range of π/2<β≤π, the user may feel uncomfortable since the image is not rotated in the range even when the screen is rotated about the axis of the lateral direction. In consideration of a posture detection error, when the value of β is near π, it is likely that the screen is at the reverse of the reference posture even though β is not equal to π. Accordingly, the value of a monotonically increasing function or a monotonically decreasing function of β in a range of 0≤β≤π may be used as an indicator of the reliability of the angle α+γ by which the image is rotated. Although a value such as β obtained from the above simultaneous equations and the $a_{33}$ element of the posture matrix A may be used as the indicator, it is preferable that the $a_{33}$ element of the posture matrix A be directly used as the indicator in order to reduce the amount of calculation. In the case where the $a_{33}$ element of the posture matrix A is directly used as the indicator, the range of the indicator is [−1, 1] and reliability indicated by the indicator decreases as the value of the indicator decreases.

2.2. Orientation-Following Display Process

Figure 8:
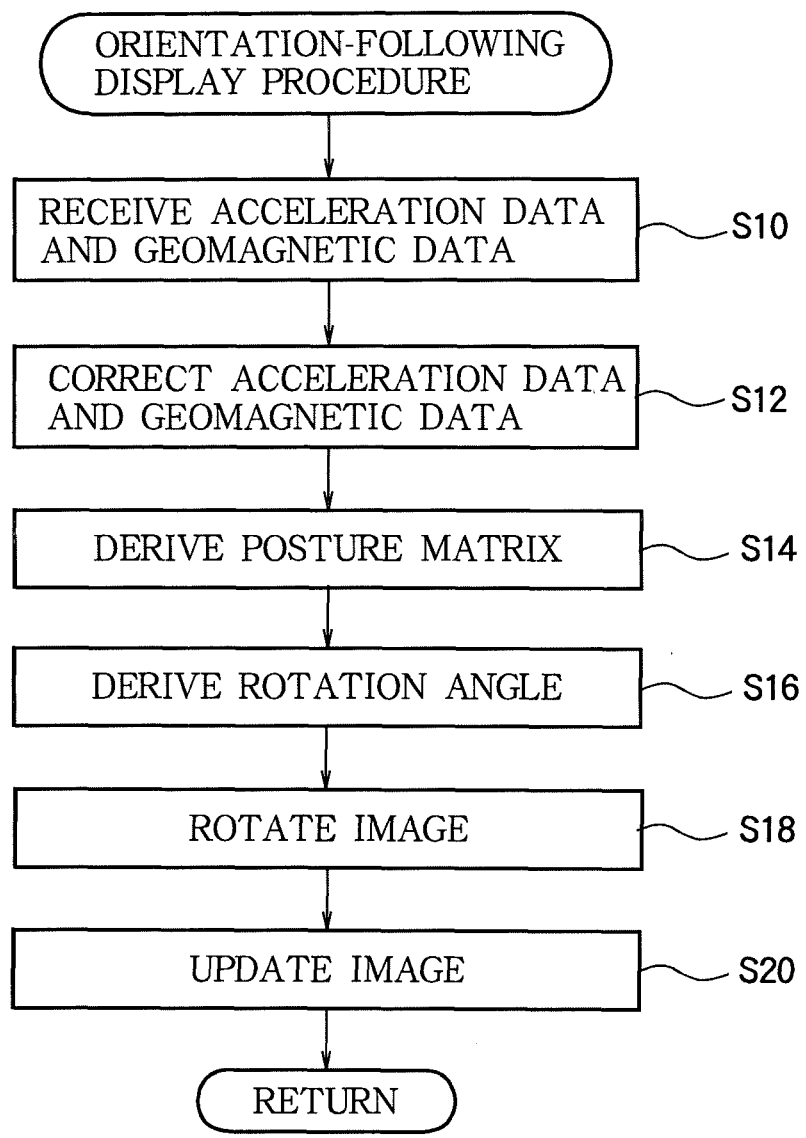
FIG. 8 is a flow chart associated with the embodiment of the invention.
Figure 9:
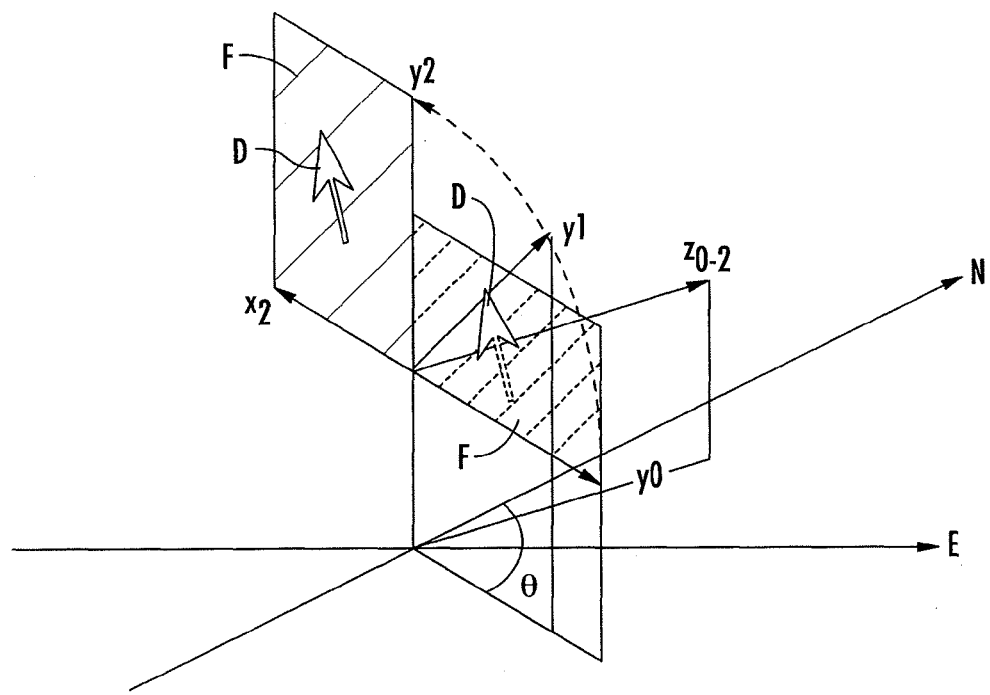
FIG. 9 is a perspective diagram illustrating the related art.

FIG. 8 is a flow chart illustrating the flow of an orientation-following display process performed by the controller 60.

First, the controller 60 receives acceleration data and geomagnetic data from the acceleration sensor 40 and the geomagnetic sensor 50, respectively (step S10).

Then, the controller 60 corrects the acceleration data and geomagnetic data (step S12). Here, the controller 60 corrects the offset of the acceleration data and geomagnetic data or the like.

Then, the controller 60 derives the posture matrix A described above based on the acceleration data and the geomagnetic data (step S14).

Then, the controller 60 derives α+γ, as an angle by which the image is rotated, based on the posture matrix A (step S16). That is, the controller 60 performs a calculation for deriving α+γ which satisfies Equations (19) and (20) using the 4 elements of the posture matrix A.

Then, the controller 60 rotates the original image of the compass needle D by the angle α+γ to generate at least a part of an image that is to be displayed on the screen 11 (step S18).

Then, the controller 60 writes the rotated image of the compass needle D to a frame memory region and updates the screen 11 of the display 10 (step S20).

By repeating the above procedure, the screen 11 is regularly updated so that a direction indicated by the compass needle D follows the direction of north which is the reference horizontal orientation in the real-world space. If the update interval of the screen 11 is short, a compass needle D, which is recognized as always indicating the north of the real-world space no matter the posture of the screen 11, is displayed on the screen 11.

3. Other Embodiments

Of course, the scope of the invention is not limited to the above embodiments and a variety of modifications can be made without departing from the spirit of the invention. For example, the image that is allowed to follow the reference horizontal orientation of the real-world space may be a map or the like. A map that follows the reference horizontal orientation of the real-world space can be achieved by rotating the image of the map, on which north is indicated to be directed from the bottom side to the top side, by the sum of the z-x-z Euler angles α and γ. This allows the map to be displayed such that the travel direction on the map coincides with the travel direction of the real-world space. For example, the posture of the screen 11 which is upright as shown in FIG. 7 may be the reference posture of the screen 11. In addition, for example, the invention can be applied to a variety of mobile information devices such as an electronic compass, a mobile phone, and a PND. For example, the invention can also be applied to a stationary game machine designed such that the screen and the user move integrally. That is, the invention can be applied to a variety of electronic devices including means for detecting the posture of the screen.

In addition, for example, instead of directly deriving α+γ which satisfies Equations (19) and (20), the value of α+γ may be derived after α and γ are individually obtained as follows. First, cos β is uniquely obtained from Equation (18) since 0≤β≤π.

Then, the following equations are obtained from Equations (15), (12), (17), and (16) when sin β≠0 (i.e., when 0<β<π or when −1<cos β<1).

$$\cos \alpha = a_{23}/\sin \beta \quad (21)$$

$$\sin \alpha = a_{13}/\sin \beta \quad (22)$$

$$\cos \gamma = -a_{32}/\sin \beta \quad (23)$$

$$\sin \gamma = a_{21}/\sin \beta \quad (24)$$

α can be derived by applying the values of $a_{23}$ and $a_{13}$ to an arctangent function since the denominators of right-hand sides of Equations (21) and (22) are the same. Similarly, γ can be derived by applying the values of $-a_{32}$ and $a_{31}$ to an arctangent function.

On the other hand, when sin β=0, α and γ cannot be uniquely derived. However, α is uniquely obtained when the value of γ is fixed to zero (γ=0) assuming that it is only necessary to obtain at least one of a number of representations. Here, α can be derived by applying the values of $a_{11}$ and $a_{12}$ to an arctangent function since the following equations are obtained from Equations (10) and (11).

$$\cos \alpha = a_{11}$$

$$\sin \alpha = a_{12}$$

In the case where α and γ are individually obtained in this manner, calculation procedures should be switched according to conditions. However, in the case where α+γ is directly obtained, it is possible to reduce program cost since the conditional branching process is unnecessary.

The invention claimed is:

1. An apparatus with an orientation-following display, comprising:

a display device having a screen that can be positioned in arbitrary postures including a reference posture relative to a real-world space having a reference horizontal orientation, the screen having an xyz orthogonal coordinate system fixed to the screen, an x axis of the xyz orthogonal coordinate system being set parallel to a lateral direction in the real-world space when the screen is positioned at the reference posture and a z axis of the xyz orthogonal coordinate system being perpendicular to the screen, the posture of the screen in the real-world space being defined by z-x-z Euler angles α, β, and γ of the xyz orthogonal coordinate system, wherein α≠0, β≠0, and γ≠0, wherein the screen displays an image to enable recognition of the reference horizontal orientation of the real-world space such that the reference horizontal orientation recognized in the screen coincides with the reference horizontal orientation of the real-world space when the image is displayed on the screen at the reference posture; and a control device that derives α+γ as an angle by which the image is rotated so that the reference horizontal orientation recognized from the image follows the reference horizontal orientation of the real-world space when the image is displayed on the screen at arbitrary postures.

2. The apparatus according to claim 1, wherein the control device calculates a posture matrix A, which is an orthonormal matrix representing the posture of the xyz orthogonal coordinate system in the real-world space, and which is derived by the following steps of:

acquiring acceleration data g which is a vector of three dimension indicating gravitational direction and geomagnetic data h which is a vector of three dimension indicating a geomagnetic direction in the real-world space;

defining a vector f as f=g×h, where "×" represents cross product;

defining a vector h' as h'=f×g, where h' is a vector indicating the reference horizontal orientation; and normalizing the vectors f, h', and −g to size 1 and then arranging the normalized vectors f, h', and −g in rows, sequentially from the top, to produce the posture matrix A, and wherein assuming that the thus produced posture matrix A is denoted as:

$$A = [x \ y \ z],$$

where $$x = \begin{bmatrix} a_{11} \\ a_{21} \\ a_{31} \end{bmatrix}, y = \begin{bmatrix} a_{12} \\ a_{22} \\ a_{32} \end{bmatrix}, z = \begin{bmatrix} a_{13} \\ a_{23} \\ a_{33} \end{bmatrix}$$

the display control device derives α+γ as a value that satisfies the following equations:

where β is not equal to π and β is given as $a_{33}=\cos\beta$.

3. The apparatus according to claim 2, wherein the control device determines reliability of α+γ derived as the angle by which the image is rotated, using a an indicator of the reliability.

4. The apparatus according to claim 1, further comprising:

an acceleration sensor that outputs acceleration data representing acceleration components of 3 axes associated to the real-world space; and a geomagnetic sensor that outputs geomagnetic data representing geomagnetic components of 3 axes associated to the real-world space, wherein the control device derives the posture of the screen in the real-world space based on the acceleration data and the geomagnetic data, and rotates the image by the angle of α+γ according to the posture of the screen.

5. A method of performing an orientation-following display in a display device having a screen that is positioned in arbitrary postures including a reference posture relative to a real-world space having a reference horizontal orientation, the method comprising:

setting an xyz orthogonal coordinate system to the screen such that an x axis of the xyz orthogonal coordinate system is set parallel to a lateral direction in the real-world space when the screen is positioned at the reference posture and a z axis of the xyz orthogonal coordinate system is perpendicular to the screen;

defining the posture of the screen in the real-world space by z-x-z Euler angles α, β, and γ of the xyz orthogonal coordinate system, wherein α≠0, β≠0, and γ≠0;

displaying an image in the screen to enable recognition of the reference horizontal orientation of the real-world space such that the reference horizontal orientation recognized in the screen coincides with the reference horizontal orientation of the real-world space when the image is displayed on the screen at the reference posture; and deriving α+γ as an angle by which the image is rotated so that the reference horizontal orientation recognized from the image follows the reference horizontal orientation of the real-world space when the image is displayed on the screen at arbitrary postures.

6. A non-transitory computer readable recording medium for use in a computer, the medium containing a program executable by the computer to perform a process of orientation-following display with a display device, having a screen that is positioned in arbitrary postures including a reference posture relative to a real-world space having a reference horizontal orientation, the process comprising:

setting an xyz orthogonal coordinate system to the screen such that an x axis of the xyz orthogonal coordinate system is set parallel to a lateral direction in the real-world space when the screen is positioned at the reference posture and a z axis of the xyz orthogonal coordinate system is perpendicular to the screen;

defining the posture of the screen in the real-world space by z-x-z Euler angles α, β, and γ of the xyz orthogonal coordinate system, wherein α≠0, β≠0, and γ≠0;

displaying an image in the screen to enable recognition of the reference horizontal orientation of the real-world space such that the reference horizontal orientation recognized in the screen coincides with the reference horizontal orientation of the real-world space when the image is displayed on the screen at the reference posture; and deriving α+γ as an angle by which the image is rotated so that the reference horizontal orientation recognized from the image follows the reference horizontal orientation of the real-world space when the image is displayed on the screen at arbitrary postures.

* * * * *